(12) United States Patent
Takahata et al.

(10) Patent No.: US 8,460,812 B2
(45) Date of Patent: Jun. 11, 2013

(54) LITHIUM SECONDARY BATTERY

(75) Inventors: Koji Takahata, Toyota (JP); Hideki Sano, Daito (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/516,259

(22) PCT Filed: Dec. 17, 2009

(86) PCT No.: PCT/JP2009/071054
§ 371 (c)(1),
(2), (4) Date: Jun. 15, 2012

(87) PCT Pub. No.: WO2011/074098
PCT Pub. Date: Jun. 23, 2011

(65) Prior Publication Data
US 2012/0258343 A1    Oct. 11, 2012

(51) Int. Cl.
*H01M 4/00*    (2006.01)

(52) U.S. Cl.
USPC .............................. 429/94; 429/209; 429/210

(58) Field of Classification Search
None
See application file for complete search history.

(56) References Cited

U.S. PATENT DOCUMENTS

| 5,683,834 A | 11/1997 | Fujimoto et al. | |
|---|---|---|---|
| 2011/0189546 A1* | 8/2011 | Ikeda | 429/232 |
| 2011/0281161 A1* | 11/2011 | Ikeda et al. | 429/211 |

FOREIGN PATENT DOCUMENTS

| JP | 6-76819 | 3/1994 |
|---|---|---|
| JP | 8-130035 | 5/1996 |
| JP | 9-147834 | 6/1997 |
| JP | 9-161768 | 6/1997 |
| JP | 9-180759 | 7/1997 |
| JP | 9-185960 | 7/1997 |
| JP | 10-64522 | 3/1998 |
| JP | 2007-109512 | 4/2007 |
| JP | 2007-227367 | 9/2007 |
| JP | 2009-37893 | 2/2009 |
| WO | WO 2008/029719 A1 | 3/2008 |

OTHER PUBLICATIONS

JP, 10-270013, A (1998), a raw machine translation.*
JP, 08-130035, A (1996), a raw machine translation.*
www.thesaurus.com entry.*
International Search Report in International Application No. PCT/JP2009/071054; Mailing Date: Feb. 9, 2010.

* cited by examiner

*Primary Examiner* — Milton I Cano
*Assistant Examiner* — Carmen Lyles-Irving
(74) *Attorney, Agent, or Firm* — Finnegan, Henderson, Farabow, Garrett & Dunner, LLP

(57) ABSTRACT

A lithium secondary battery obtained by the present invention has a negative electrode sheet 20 in which the theoretical capacities of the negative active material per unit area are equalized in a negative active material layer 24b on the outer circumference side and a negative active material layer 24a on the inner circumference side of a negative electrode collector 22, and at least one of the following conditions is met with respect to at least part of a bent section 85, which is bent toward the inside of a wound electrode body 80: (1) the percentage content of binder of the outer negative active material layer 24b is smaller than the percentage content of binder of the inner negative active material layer 24a; and (2) the density of the outer negative active material layer 24b is smaller than the density of the inner negative active material layer 24a.

9 Claims, 8 Drawing Sheets

LITHIUM SECONDARY BATTERY

CROSS-REFERENCE TO RELATED APPLICATIONS

This application is a national phase application of International Application No. PCT/JP2009/071054, filed Dec. 17, 2009, the content of which is incorporated herein by reference.

TECHNICAL FIELD

The present invention relates to a lithium secondary battery provided with a wound electrode body, and specifically relates to a lithium secondary battery having enhanced durability with respect to charge-discharge cycles.

BACKGROUND ART

In recent years, lithium-ion batteries, nickel-hydrogen batteries and other secondary batteries have become increasingly important as vehicle-mounted power sources or power sources for personal computers and portable devices. Lithium-ion batteries are particularly promising as high-output vehicle-mounted power sources because they provide high energy densities with low weight. In a lithium-ion battery, charge and discharge are accomplished by means of the back-and-forth movement of lithium ions between positive and negative electrodes.

In a typical configuration, this kind of lithium-ion secondary battery has an electrode body (wound electrode body) comprising sheet electrodes wound in a spiral. In this wound electrode body, as shown in FIG. 11 for example, negative electrode sheet 1 having a structure in which negative active material layers 3a and 3b each containing a negative active material are supported on both sides of negative electrode collector 2, and positive electrode sheet 4 having a structure in which positive active material layers 6a and 6b each containing a positive active material are supported on both sides of positive electrode collector 5, are wound in a spiral with separators 8a and 8b therebetween. Patent Documents 1 to 4 are examples of prior art relating to batteries provided with this kind of wound electrode body.

CITATION LIST

Patent Literature

Patent Document 1: Japanese Patent Application Laid-open No. H9-180759
Patent Document 2: Japanese Patent Application Laid-open No. 2007-109512
Patent Document 3: Japanese Patent Application Laid-open No. H10-064522
Patent Document 4: Japanese Patent Application Laid-open No. H9-147834

SUMMARY OF INVENTION

In a lithium-ion secondary battery provided with this wound electrode body, of the two negative active material layers 3a and 3b on either side of negative electrode collector 2, negative active material layer 3b on the outer circumference side of negative electrode collector 2 faces outer positive active material layer 6a with separator 8b therebetween as shown in FIG. 11, and lithium (Li) ions move back and forth between negative active material layer 3b and positive active material layer 6a. Meanwhile, negative active material layer 3a on the inner circumference side of negative electrode collector 2 faces inner positive active material layer 6b with separator 8a therebetween, and Li ions move back and forth between negative active material layer 3a and positive active material layer 6b.

However, the problem has been that in a wound electrode body configured as shown in FIG. 11, performance loss is likely because the areas of positive active material layers 6a and 6b separated by separators 8a and 8b differ by being on the outer circumference side and inner circumference side of negative electrode collector 2. Specifically, considered from a specific central angle of the wound electrode body, positive active material layer 6a facing negative active material layer 3b on the outer circumference side with separator 8b therebetween has a greater area than negative active material layer 3a on the inner circumference side. Depending on the conditions of use of the battery, therefore, the Li-ion receiving rate of negative active material layer 3b may be insufficient in comparison with the Li-ion release rate of positive active material layer 6a during charging (especially rapid charging). If the insufficiency is too great, there is a danger that Li ions released by positive active material layer 6a may be deposited on the surface of the negative active material rather than being taken up immediately by negative active material layer 3b. Such Li deposition can be a cause of battery performance loss (decreased battery capacity and the like). In particular, the reactivity of the negative active material (typically, the activity of the Li-ion insertion reaction) and the diffusivity of the Li ions in the negative active material layer tend to decline when the battery is charged at low temperatures (such as 0° C. or less), often causing the aforementioned performance loss (decreased battery capacity and the like).

The principal object of the present invention, which was invented in light of these problems, is to provide a lithium secondary battery having enhanced durability with respect to charge-discharge cycles (especially low-temperature charge-discharge cycles).

The lithium secondary battery provided by the present invention is provided with a wound electrode body having a positive electrode sheet and a negative electrode sheet wound together with a separator therebetween. The negative electrode sheet has a structure in which negative active material layers each containing a negative active material and a binder are supported on a sheet-shaped negative electrode collector on a surface facing an outer circumference and a surface facing an inner circumference of the wound electrode body.

In this negative electrode sheet, theoretical capacities of the negative active material per unit area are equalized in the negative active material layer on the outer circumference side (hereunder, the outer mixture layer) and the negative active material layer on the inner circumference side (hereunder, the inner mixture layer) of the negative electrode collector, and at least one of the following conditions is met with respect to at least part of a bent section that is bent toward the inside of the wound electrode body:

(1) a percentage content of binder of the outer negative active material layer is smaller than a percentage content of binder of the inner negative active material layer; and (2) a density of the outer negative active material layer is smaller than a density of the inner negative active material layer.

In the configuration of the present invention, because reducing the percentage content of binder of the outer mixture layer serves to reduce the amount of binder covering the surface of the negative active material, the surface area of the negative active material that participates in a reaction (effective surface area) is increased, thereby increasing the reactivity of the outer mixture layer (activity of Li ion insertion/removal reaction). This makes it easier for Li ions to enter the negative active material (that is, increases the Li ion receiving rate of the outer mixture layer), making it possible to control Li deposition during charging and enhance durability with respect to charge-discharge cycles.

If the percentage content of binder of the negative electrode as a whole (both the outer mixture layer and the inner mixture layer) is decreased in order to increase the Li ion receiving rate and control Li deposition, the trade-off is that Li ions are more likely to dissociate under high-temperature conditions, detracting from the high-temperature storage characteristics (high-temperature capacity maintenance rate, etc.).

Thus, in the present invention, the theoretical capacity of the negative active material contained per unit area is equalized in the outer mixture layer and inner mixture layer, while the percentage content of binder of the outer mixture layer, which is the most liable to Li deposition, is reduced in comparison with the binder content of the inner mixture layer. By thus providing a suitable difference between the percentage contents of binder of the mixture layers on the outer circumference side and inner circumference side, it is possible to appropriately adjust the relative Li ion receiving rates of the two, and thereby control Li deposition in the outer mixture layer without sacrificing the high-temperature storage characteristics of the negative electrode as a whole. Thus, with the present invention it is possible to provide a high-performance lithium secondary battery having both high-temperature storage characteristics and charge-discharge cycle characteristics.

In the configuration of the present invention, decreasing the density of the outer mixture layer increases the number of gaps in the outer mixture layer, thereby increasing the electrolyte retention capacity of the outer mixture layer and increasing the movement and diffusivity of Li ions in the outer mixture layer. This makes it easier for Li ions to enter the negative active material (that is, increases the Li ion receiving rate of the outer mixture layer), making it possible to control Li deposition during charging and enhance durability with respect to charge-discharge cycles.

If the density of the negative electrode as a whole (both the outer mixture layer and the inner mixture layer) is decreased in order to increase the Li ion receiving rate and control Li deposition, the trade off is that this enlarges the structure (volume) of the negative active material layer, resulting in reduced energy density and decreased contact between active material molecules, and thereby increasing the DC resistance of the negative electrode and detracting from battery performance.

Thus, in the present invention, the theoretical capacity of the negative active material contained per unit area is equalized in the outer mixture layer and inner mixture layer, while the density of the of the outer mixture layer, which is the part the most liable to Li deposition, is reduced in comparison with the density of the inner mixture layer. By thus providing a suitable difference between the mix densities of the outer mixture layer and inner mixture layer, it is possible to appropriately adjust the relative Li-ion receiving rates of the two, and thereby control Li deposition in the outer mixture layer while also preventing a rise in resistance in the negative electrode as a whole. Thus, with the present invention it is possible to provide a high-performance lithium secondary battery having low negative electrode resistance and excellent charge-discharge cycle characteristics.

"Equalizing the theoretical capacity of the active material contained per unit area" here means that the battery is designed so as to make the theoretical capacity of the active material contained per unit area (here meaning unit area when the negative electrode sheet is in a flat state) the same in both mixture layers (or in other words, with no intent to make the theoretical capacities different). Thus, embodiments of the present invention may include both those in which the theoretical capacities of the outer mixture layer and inner mixture layer of the negative electrode sheet are strictly the same in an actual prepared electrode, and those in which the theoretical capacities differ unintentionally due to manufacturing variation or the like to some degree from the target values (identical theoretical capacities).

In a preferred embodiment of the lithium secondary battery disclosed here, the percentage content of binder of the outer negative active material layer is 50% to 90% of the percentage content of binder of the inner negative active material layer. Both high-temperature storage characteristics and cycle characteristics can be achieved at a high level by providing a difference in percentage content of binder within this range.

In a preferred embodiment of the lithium secondary battery disclosed here, the outer negative active material layer and inner negative active material layer are made of the same negative active material. "The same negative active material" here means that the material and properties (particle size, specific surface area, tap density, etc.) are the same. A typical example of "the same negative active material" is negative active material from the same lot. By using the same negative active material for the outer mixture layer and the inner mixture layer, it is possible to control the effect of performance variance between different lots of the negative active material, and more accurately adjust the relative Li ion rates of the outer mixture layer and the inner mixture layer.

In a preferred embodiment of the lithium secondary battery disclosed here, a tap density of the negative active material used in the outer negative active material layer is smaller than a tap density of the negative active material used in the inner negative active material layer. With this configuration, it is easy to achieve the desired density difference.

In a preferred embodiment of the lithium secondary battery disclosed here, a specific surface area of the negative active material contained in the outer negative active material layer is greater than a specific surface area of the negative active material contained in the inner negative active material layer. This tends to increase the reactivity (activity of Li insertion/removal reaction) of the negative active material because in general, the surface area of a negative active material that participates in a reaction is greater the greater the specific surface area of the negative active material. Thus, the relationship between the Li ion receiving rates of the outer and inner mixture layers can be adjusted more appropriately by providing a difference in the specific surface areas of the active materials.

In a preferred embodiment of the lithium secondary battery disclosed here, the electrode body is wound in a cylindrical shape. In a cylindrical electrode body, the entire length of the negative electrode sheet forms a bent section (curved R section) that bends inward, so Li deposition is likely to occur along the entire length of the outer mixture layer. Thus, the technical significance of the present invention is greater when applied to a lithium secondary battery provided with a cylindrical wound electrode body. When a cylindrical wound electrode body is used, the negative electrode sheet is preferably configured so as to meet at least one of conditions (1) and (2) above along the entire length of the sheet.

A method for manufacturing a lithium secondary battery fulfilling condition (1) above is also provided by the present invention. This manufacturing method includes preparing a negative electrode sheet by performing drying with heat applied from a reverse side of a negative electrode collector that is a side of the collector facing the inner circumference of the wound electrode body, at least when forming the outer negative active material layer on the collector. It also includes constructing a lithium secondary battery by using this negative electrode sheet. Because segregation of the binder due to migration during drying is controlled with this method, good adhesiveness (durability) between the outer mixture layer and the collector is obtained even when the amount of binder in the outer mixture layer is reduced. Thus, a suitable difference in the amount of binder between the outer circumference side and inner circumference side can be provided without increasing the amount of binder in the inner mixture layer unnecessarily (to make it greater than the amount of binder in the outer mixture layer).

Any of the lithium secondary batteries disclosed here may have performance suited to a vehicle-mounted battery (fulfilling at least one of the conditions of high durability with respect to charge-discharge cycles, good low-temperature characteristics and excellent high-temperature storage characteristics). Thus, a vehicle equipped with any of the lithium secondary batteries disclosed here is provided by the present invention. In particular, a vehicle (such as an automobile) having this lithium secondary battery as a power source (typically, the power source of a hybrid vehicle or electric vehicle) is provided.

DESCRIPTION OF EMBODIMENTS

Figure 1:
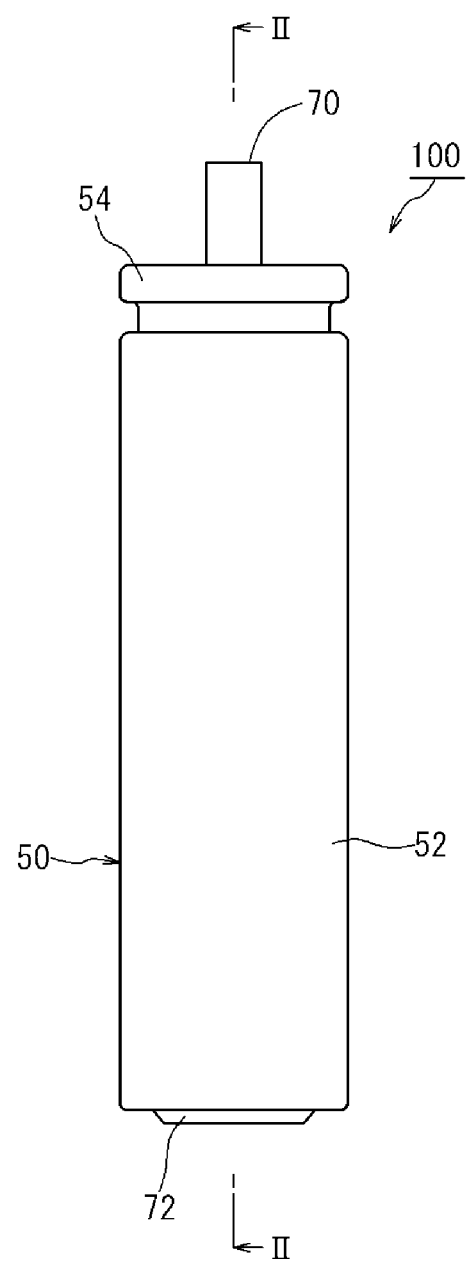
FIG. 1 is a side view illustrating a lithium secondary battery of one embodiment of the present invention.

Embodiments of the present invention are explained below with reference to the drawings. In the drawings below, the same symbols are assigned to members and parts having the same function. The dimensional relationships in each drawing (length, width, thickness, etc.) do not reflect actual dimensional relationships. Matters not specifically mentioned in this Description that are necessary for implementing the present invention (for example, the configuration and method of preparing an electrode body equipped with a positive and negative electrode, the configuration and method of preparing a separator and electrolyte, and general techniques for constructing lithium secondary batteries and other batteries) can be understood as design matters by a person skilled in the art based on prior art in the field.

First Embodiment

The present invention is explained in detail below using the example of a lithium secondary battery (lithium-ion battery) comprising a cylindrical wound electrode body (wound electrode body) contained together with a non-aqueous electrolyte in a cylindrical container, although this is not intended as a limitation.

Figure 2:
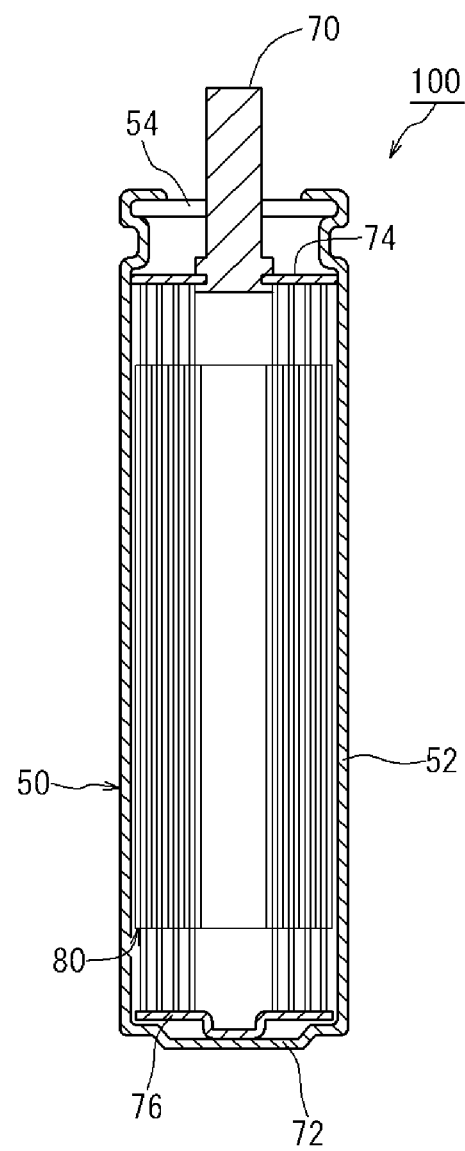
FIG. 2 is a cross-section along the II-II line in FIG. 1.
Figure 3:
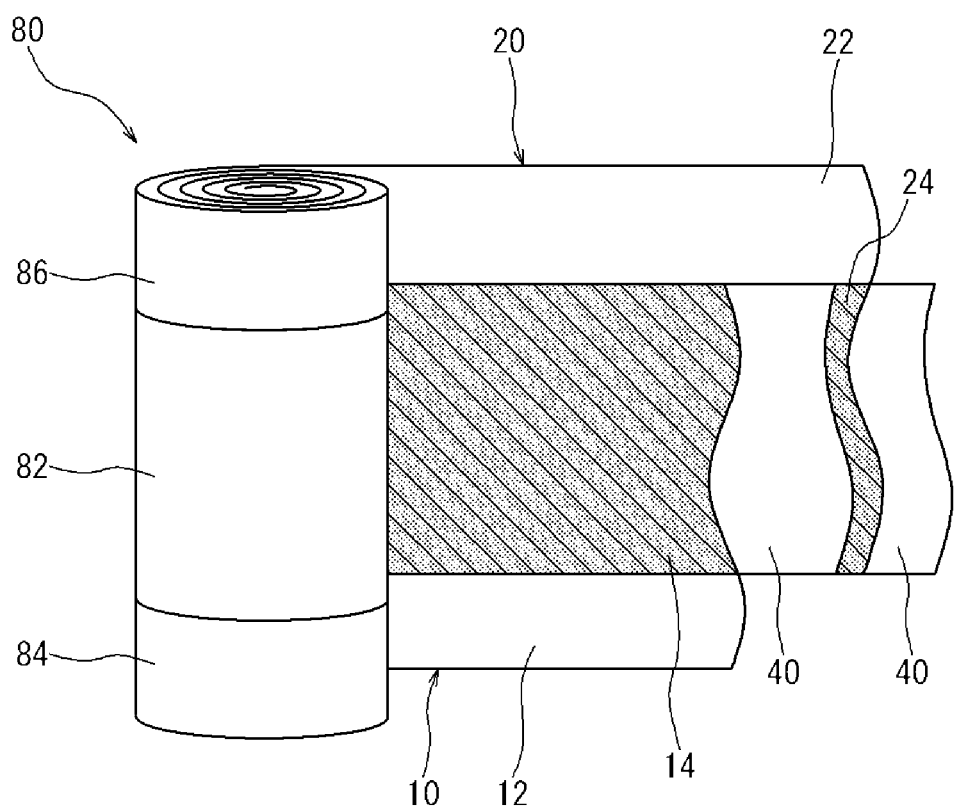
FIG. 3 illustrates a (cylindrical) wound electrode body of a lithium secondary battery of one embodiment of the present invention.

FIGS. 1 to 3 illustrate the general configuration of a lithium-ion battery of one embodiment of the present invention. In lithium-ion battery 100, electrode body (wound electrode body) 80 comprising long thin positive electrode sheet 10 and long thin negative electrode sheet 20 wound in a cylindrical shape with long thin separator 40 sandwiched therebetween is contained together with a non-aqueous liquid electrolyte (not shown) in container 50, which has a shape (cylindrical shape) capable of containing wound electrode body 80.

Container 50 comprises container body 52 in the shape of a cylinder closed on the bottom and open on the top, and cap 54 closing the opening. A metal material such as aluminum, steel or Ni-plated SUS (Ni-plated SUS in this embodiment) is preferably used as the material of container 50. Alternatively, container 50 may be molded of a resin material such as polyphenylene sulfide (PPS) or polyimide resin. Positive terminal 70, which is connected electrically to positive electrode 10 of wound electrode body 80, is provided on the upper surface of container 50 (that is, on cap 54). Negative terminal 72 (container body 52 in this embodiment), which is connected electrically to negative electrode 20 of wound electrode body 80, is provided on the lower surface of container 50. Wound electrode body 80 is contained together with a non-aqueous liquid electrolyte (not shown) in container 50.

Apart from the configuration of negative electrode sheet 20, wound electrode body 80 of this embodiment is similar to a wound electrode body of an ordinary lithium-ion battery, and as shown in FIG. 3, has a long thin (band-shaped) sheet structure before assembly of wound electrode body 80.

The structure of positive electrode sheet 10 comprises positive active material layers 14 containing a positive active material supported on both sides of positive electrode collector 12, which is a long thin sheet of foil. However, positive active material layer 14 is not attached to one edge (lower edge in the drawings) extending along one end of positive electrode sheet 10 in the direction of width, thereby forming a part without a formed positive active material layer, in which a specific width of positive electrode collector 12 is exposed.

Like positive electrode sheet 10, the structure of negative electrode sheet 20 comprises negative active material layers 24 containing a negative active material supported on both sides of negative electrode collector 22, which is a long thin sheet of foil. However, negative active material layer 24 is not attached to one edge (upper edge in the drawings) extending along one end of negative electrode sheet 20 in the direction of width, thereby forming a part without a formed negative active material layer, in which a specific width of negative electrode collector 22 is exposed.

When preparing wound electrode body 80, positive electrode sheet 10 and negative electrode sheet 20 are layered with separator 40 therebetween. Positive electrode sheet 10 and negative electrode sheet 20 are layered so as to be slightly offset from each other in the direction of width so that the part without formed positive active material layer on positive electrode sheet 10 and the part without formed negative active material layer on negative electrode sheet 20 protrude on either side of separator sheet 40 in the direction of width. Wound electrode body 80 can be prepared by winding a layered body thus constructed.

Wound core part 82 (the part in which positive active material layer 14 of positive electrode sheet 10, negative active material layer 24 of negative electrode sheet 20 and separator sheet 40 are tightly layered together) is formed in the center of coiled electrode body 80 in the winding axis direction. The parts of positive electrode sheet 10 and negative electrode sheet 20 without formed active material layers protrude outside wound core part 82 at either end of wound electrode body 80 in the winding axis direction. Positive lead terminal 74 and negative lead terminal 76 are attached, respectively, to positive protruding part (part without formed positive active material layer 14) 84 and negative protruding part (part without formed negative active material layer 24) 86, which are thereby electrically connected, respectively, to positive terminal 70 and negative terminal 72 (container body 52 in this case).

Apart from negative electrode sheet 20, the components of this wound electrode body 80 may be similar to those of a wound electrode body of a conventional lithium-ion battery, without any particular limitations. To form positive electrode sheet 10 for example, positive active material layers 14 consisting principally of a lithium-ion battery positive active material can be applied to long thin positive electrode collector 12. Aluminum foil or another metal foil suited to a positive electrode can be used for positive electrode collector 12. One or 2 or more materials conventionally used in lithium-ion batteries can be used for the positive active material, without any particular limitations. Desirable examples include positive active materials consisting primarily of lithium-nickel oxide ($LiNiO_2$), lithium-cobalt oxide ($LiCoO_2$), lithium-manganese oxide ($LiMn_2O_4$) and other oxides containing lithium and a transition metal element as constituent metal elements (lithium-transition metal oxides).

To form negative electrode sheet 20, negative active material layers 24 consisting primarily of a lithium-ion battery negative active material can be applied to long thin negative electrode collector 22. Copper foil or another metal foil suited to a negative electrode can be used for negative electrode collector 22.

One or 2 or more materials conventionally used in lithium-ion batteries can be used as the negative active material, without any particular limitations. Examples include graphite carbon, amorphous carbon and other carbon materials, and lithium-containing transition metal oxides and transition metal nitrides and the like. The technology disclosed here can be applied favorably to a negative active material consisting primarily of a carbon material such as graphite carbon or amorphous carbon.

Negative active material layers 24 can as necessary contain 1 or 2 or more materials that are used as components of negative active material layers in conventional lithium-ion batteries. In this embodiment, a binder is used as such a constituent material. This binder is not particularly limited as long as it is similar to those used in typical lithium secondary battery negative electrodes. For example, water-soluble or water-dispersible polymers such as styrene-butadiene rubber (SBR), carboxymethylcellulose (CMC), polytetrafluoroethylene (PTFE), polyethylene (PE) and polyacrylic acid (PAA) can be used. It is also possible to use an organic solvent-based polymer such as polyvinylidene fluoride (PVDF) or polyvinylidene fluoride-hexafluoropropylene copolymer (PVDF-HFP).

Separator sheet 40 used between positive and negative electrode sheets 10 and 20 can preferably be made of porous polyolefin resin. For example, a porous separator sheet made of synthetic resin (such as polyethylene or other polyolefin resin) can be used by preference. When a solid electrolyte or gel electrolyte is used as the electrolyte, a separator may be unnecessary (in this case, the electrolyte itself can function as a separator).

Figure 4:
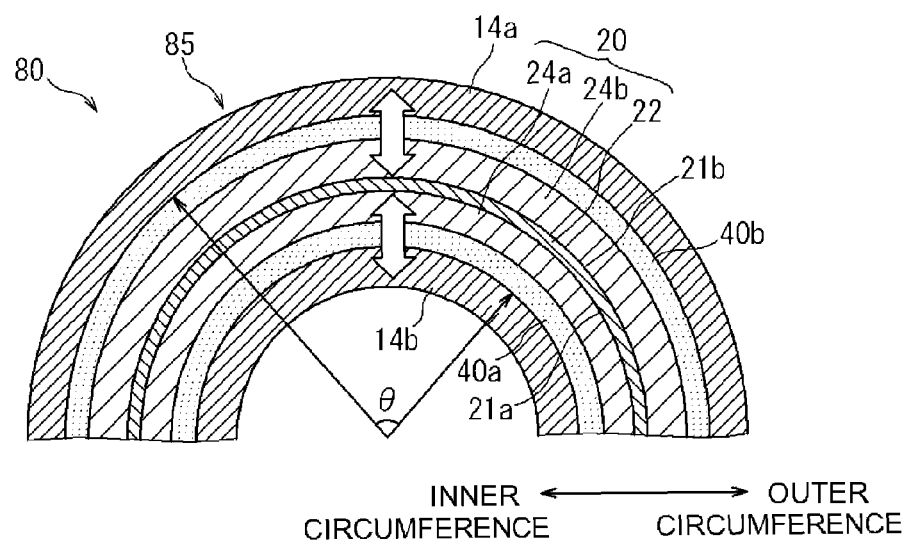
FIG. 4 is an enlarged cross-section showing the essential parts of a wound electrode body of a lithium secondary battery of one embodiment of the present invention.

Negative electrode sheet 20 of this embodiment is explained in detail next with reference to FIG. 4. FIG. 4 is a model cross-section showing an enlarged view of part of wound electrode body 80 of this embodiment cut across the winding axis.

As described above, wound electrode body 80 comprises positive electrode sheet 10 and negative electrode sheet 20 wound together with separator 40 therebetween. As shown in FIG. 4, negative electrode sheet 20 has a structure in which negative active material layers 24a and 24b each containing a negative active material and a binder are supported on sheet-shaped negative electrode collector 22 on surface 21b facing the outer circumference and surface 21a facing the inner circumference of wound electrode body 80. Negative active material layer 24b on the outer circumference side of negative electrode collector 22 faces positive active material layer 14a on the outer circumference side on the other side of separator 40b, and Li ions pass back and forth between negative active material layer 24b and positive active material layer 14a. Negative active material layer 24a on the inner circumference side of negative electrode collector 22 faces positive active material layer 14b on the inner circumference side on the other side of separator 40a, and Li ions pass back and forth between negative active material layer 24a and positive active material layer 14b.

In bent section (curved R section) 85, which is bent toward the inside of wound electrode body 80, there is a difference between the areas of positive active material layers 14a and 14b facing outer mixture layer 24b and inner mixture layer 24a on the other side of separators 40. Specifically, considering a specific central angle θ of the wound electrode body, positive active material layer 14a facing outer mixture layer 24b on the other side of separator 40 has a greater area than inner mixture layer 24a. Depending on the conditions of use of the battery, therefore, the Li-ion receiving rate of outer mixture layer 24b may be insufficient in comparison with the Li ion release rate of positive active material layer 14a during charging (especially rapid charging). If the insufficiency is too great, there is a danger that Li ions released by positive active material layer 14a may be deposited on the surface of the negative active material rather than being taken up immediately by outer mixture layer 24b. Such Li deposition can be a cause of battery performance loss (decreased battery capacity, etc.).

Therefore, this embodiment is configured so that the theoretical capacities of the negative active material per unit area are equalized in mixture layer 24b on the outer circumference side and mixture layer 24a on the inner circumference side of negative electrode collector 22 in negative electrode sheet 20, while the percentage content of binder of outer mixture layer 24b is smaller than the percentage content of binder of inner mixture layer 24a.

In this configuration, decreasing the percentage content of binder of outer mixture layer 24b serves to decrease the amount of binder covering the surface of the negative active material, thereby increasing the surface area of the negative active material that participates in a reaction (effective surface area), and increasing the reactivity of outer mixture layer 24b (activity of Li insertion/removal reaction). This makes it easier for Li ions to enter the negative active material (that is, increases the Li ion receiving rate of outer mixture layer 24b), making it possible to control Li deposition during charging and increase durability with respect to charge-discharge cycles. This effect can be obtained by applying the aforementioned feature (percentage content of binder) to at least part of the bent section. For example, this feature can be applied only to an inner circumference part with a larger curvature. Normally, better effects can be achieved by applying this feature to most (normally to effectively all) of the bent section. In an electrode body 80 that is wound cylindrically as in the present embodiment, bent section (curved R section) 85 is typically formed by the entire length of negative electrode sheet 20.

If the percentage content of binder of the negative electrode as a whole (both outer mixture layer 24b and inner mixture layer 24a) is decreased in order to increase the Li ion receiving rate and control Li deposition, the trade-off is that Li ions are more likely to dissociate under high-temperature conditions, detracting from the high-temperature storage characteristics (high-temperature capacity maintenance rate, etc.).

Thus, in the present embodiment, the theoretical capacity of the negative active material contained per unit area in outer mixture layer 24b is equalized with that in inner mixture layer 24a, while the percentage content of binder of outer mixture layer 24b, which is the most liable to Li deposition, is reduced in comparison with the binder content of inner mixture layer 24a. By thus providing a suitable difference between the percentage contents of binder of outer mixture layer 24b and inner mixture layer 24a, it is possible to appropriately adjust the relative Li ion receiving rates of the two, and thereby control Li deposition in the outer mixture layer while maintaining the high-temperature storage characteristics of the negative electrode as a whole. Thus, with the present embodiment it is possible to provide a high-performance lithium secondary battery having both high-temperature storage characteristics and charge-discharge cycle characteristics.

Another possible method for controlling Li deposition would be to give the negative active material in the outer mixture layer a greater capacity than in the inner mixture layer. Using this method, however, because the theoretical capacity of the active material contained per unit area in the outer mixture layer is different from that in the inner mixture layer, there is a difference in the degree of deterioration differs after repeated charge and discharge. That is, because the outer mixture layer has extra capacity in comparison with the inner mixture layer having relatively small capacity, the active material contained in this mixture layer has a higher usage rate, and the active material contained in the inner mixture layer tends to deteriorate more rapidly than the active material contained in the outer mixture layer. If the degree of deterioration differs between the outer and inner mixture layers, the battery performance is greatly reduced because the battery reaction is not uniform.

By contrast, because in the present embodiment Li deposition can be controlled by appropriately adjusting the percentage content of binder (and thus the Li-ion receiving rate) while equalizing the theoretical capacities of the negative active material contained per unit area in outer mixture layer 24b and inner mixture layer 24a, it is possible to avoid a decrease in battery performance due to differences in the degree of deterioration between the outer mixture layer and the inner mixture layer.

Although this is not a limitation, the percentage content of binder of outer mixture layer 24b is preferably about 0.6 mass % to 2.8 mass % or normally about 0.7 mass % to 1.8 mass % of the total mass of outer mixture layer 24b. Meanwhile, the percentage content of binder of inner mixture layer 24a is preferably about 1.2 mass % to 3 mass % or normally about 1.4 mass % to 2 mass % of the total mass of inner mixture layer 24a. In a preferred embodiment disclosed here, the ratio of the binder content of outer mixture layer 24b to the binder content of inner mixture layer 24a is about 50% to 90%. For example, if the percentage content of binder of inner mixture layer 24a is 2 mass %, the percentage content of binder of outer mixture layer 24b is about 1 mass % to 1.6 mass %. Both high-temperature storage characteristics and cycle characteristics can be obtained at a high level by providing a difference within this range so as to appropriately adjust the relative Li-ion receiving rates on the outer and inner circumference sides.

Negative active material layers 24a and 24b can be formed for example by applying negative active material layer-forming pastes each comprising a (typically particulate) negative active material and a binder dispersed in a suitable solvent in bands on both surfaces of a sheet-shaped negative collector (the surface of the negative collector facing the outer circumference of the wound electrode body and the surface facing the inner circumference), and drying the pastes. In this case, the percentage content of binder (as solids) of the negative active material layer-forming paste applied to the outward-facing surface of the negative electrode collector is adjusted so as to be smaller than the percentage content of binder of the negative active material layer-forming paste applied to the inward-facing surface. It is thus possible to provide a difference between the percentage contents of binder of the outer and inner mixture layers.

Figure 5:
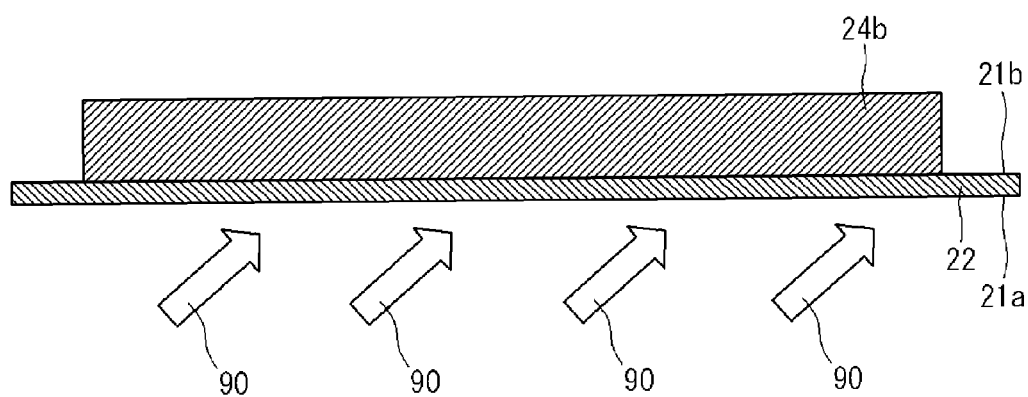
FIG. 5 is a process cross-section illustrating the manufacturing process for the negative electrode sheet of one embodiment of the present invention.

The method of drying the negative active material layer-forming pastes is not particularly limited, and for example a method of drying by hot air after application of the negative active material layer-forming pastes to negative electrode collector 22 can be adopted by preference. At least when forming outer negative active material layer 24b (the layer with the smaller binder content) on negative electrode collector 22, as shown in FIG. 5, heat is preferably applied from the reverse side of collector 22 (that is, from surface 21a of collector 22 facing the inner circumference of the wound electrode body) to prepare negative electrode sheet 20.

When drying is accomplished by applying heat either from both sides of negative electrode collector 22 or from the front side of collector 22, migration (convection) may occur during drying, so that binder near collector 22 rises and collects on the paste surface layer, resulting in insufficient binder in the lower part of the paste (near collector 22), which reduces adhesiveness between outer mixture layer 24b and collector 22. Using the aforementioned method of applying heat from the reverse side of collector 22, drying starts first from the paste near collector 22 (paste near the boundary with collector 22), so the problem of binder near collector 22 rising to the paste surface layer is controlled, ensuring sufficient binder near collector 22. Thus, good adhesiveness (durability) can be obtained even if the amount of binder in outer mixture layer 24b is reduced. Thus, a suitable difference in the amount of binder between outer mixture layer 24b and inner mixture layer 24a can be achieved without unnecessarily increasing the amount of binder in inner mixture layer 24a (in order to make it greater than the amount of binder in outer mixture layer 24b).

The thickness and density of negative active material layers 24a and 24b can be adjusted by applying suitable pressing treatment (using various conventionally known pressing methods such as roll pressing or flat-plate pressing) after drying the negative active material layer-forming pastes. It is thus possible to form negative electrode sheet 20 having different percentage contents of binder on the outer and inner sides of negative electrode collector 22.

In a preferred embodiment of the lithium secondary battery disclosed here, outer mixture layer 24b and inner mixture layer 24a are made of the same negative active material. "Same negative active material" here means that the material and properties (particle size, specific surface area, tap density and the like) are the same. A typical example of "the same negative active material" is negative active material from the same lot. By using the same negative active material for outer mixture layer 24b and inner mixture layer 24a, it is possible to control the effect of performance variance between different lots of the negative active material, and more accurately adjust the relative Li ion rates of outer mixture layer 24b and inner mixture layer 24a.

In a preferred embodiment of the lithium secondary battery disclosed here, the specific surface area of the negative active material contained in outer negative active material layer 24b is greater than the specific surface area of the negative active material contained in inner negative active material layer 24a. This tends to increase the reactivity (activity of Li insertion/removal reaction) of the negative active material because in general, the surface area of a negative active material that participates in a reaction is greater the greater the specific surface area of the negative active material. Thus, the relative Li-ion receiving rates of the outer and inner mixture layers can be adjusted more accurately by providing a difference between the specific surface areas of the active materials in the outer and inner mixture layers. The specific surface area of the negative active material can be adjusted for example by varying the particles size of the negative active material particles used in the negative active material layers. In general, the specific surface area of the negative active material tends to be greater the smaller the relative particle size of the negative active material particles.

A wound electrode body 80 of this configuration is contained in container body 52, and a suitable non-aqueous liquid electrolyte is disposed (injected) inside container body 52. The non-aqueous liquid electrolyte contained together with wound electrode body 80 in container body 52 can be similar to the non-aqueous liquid electrolytes used in conventional lithium-ion batteries, without any particular limitations. The composition of the non-aqueous liquid electrolyte typically comprises a supporting salt contained in a suitable non-aqueous solvent. Ethylene carbonate (EC), ethyl methyl carbonate (EMC), dimethyl carbonate (DMC), diethyl carbonate (DEC), propylene carbonate (PC), for example, can be used as the non-aqueous solvent. $LiPF_6$, $LiBF_4$, $LiAsF_6$, $LiCF_3SO_3$, $LiClO_4$ and other lithium salts, for example, can be used favorably as the supporting salt. For example, it is desirable to use a non-aqueous electrolyte solution comprising $LiPF_6$ as the supporting salt contained at a concentration of about 1 mol/liter in a mixed solvent comprising EC, EMC and DMC at a volume ratio of 3:4:3.

Construction (assembly) of lithium-ion battery 100 of this embodiment is completed by containing this non-aqueous liquid electrolyte in container body 52 together with wound electrode body 80, and sealing the opening of container body 52 with cap 54. The process of sealing container 52 and the process of disposing (injecting) the liquid electrolyte can be accomplished by methods similar to those used in manufacturing conventional lithium-ion batteries. The battery is then subjected to conditioning (initial charge-discharge). Such steps as degassing and quality testing can also be performed as necessary.

Second Embodiment

This embodiment differs from the first embodiment in that the density of the negative active material layers is changed rather than the percentage content of binder of the mixture layers. That is, in negative electrode sheet 20 of this embodiment the theoretical capacity of the negative active material contained per unit area in mixture layer 24a on the inner circumference side of negative electrode collector 22 is equalized with that of mixture layer 24b on the outer circumference side, while the density of outer mixture layer 24b is made smaller than the density of inner mixture layer 24a.

Outer mixture layer 24b and inner mixture layer 24a each have negative active material particles composed substantially of secondary particles, and these negative active material particles are fixed to each other by means of a binder (not shown). Moreover, outer mixture layer 24b and inner mixture layer 24a have spaces (holes) in the mixture layer to be permeated by the non-aqueous liquid electrolyte, and these spaces (holes) are formed for example by gaps between negative active material particles fixed to each other.

In this configuration, giving outer mixture layer 24b a lower density increases the number of spaces in outer mixture layer 24b so that more electrolyte solution is retained in outer mixture layer 24b, and there is more movement and diffusion of Li ions in outer mixture layer 24b. It is thus easier for Li ions to penetrate the negative active material (that is, the Li-ion receiving rate of outer mixture layer 24b is increased), making it possible to control Li deposition during charging and enhance durability with respect to charge-discharge cycles.

If the density of the negative electrode as a whole (both outer mixture layer 24b and inner mixture layer 24a) is decreased in an effort to increase the Li-ion receiving rate and control Li deposition, the trade-off is that this enlarges the structure (volume) of the negative active material layers, resulting in reduced energy density and decreased contact between active material molecules, and thereby increasing the DC resistance of the negative electrode and detracting from battery performance.

Thus, in this embodiment the theoretical capacity of the negative active material contained per unit area is equalized in outer mixture layer 24b and inner mixture layer 24a, while the density of outer mixture layer 24b, which is the part most liable to Li deposition, is reduced in comparison with the density of inner mixture layer 24a. By thus providing a suitable difference between the mix densities of outer mixture layer 24b and inner mixture layer 24a, it is possible to appropriately adjust the relative Li-ion receiving rates of the two, and thereby control Li deposition in outer mixture layer 24b while also preventing a rise in resistance in the negative electrode as a whole. Thus, with the present embodiment it is possible to provide a high-performance lithium secondary battery having low negative electrode resistance and excellent charge-discharge cycle characteristics.

The density of outer mixture layer 24b is not particularly limited, but is preferably about 1 g/cm$^3$ to 1.6 g/cm$^3$, and normally about 1.1 g/cm$^3$ to 1.5 g/cm$^3$ is preferred. The density of inner mixture layer 24a is preferably about 1.2 g/cm$^3$ to 1.7 g/cm³, and normally about 1.4 g/cm³ to 1.6 g/cm³ is preferred. In a preferred embodiment disclosed here, the ratio of the density of outer mixture layer 24b to the density of inner mixture layer 24a is about 80% to 95%. For example, if the density of inner mixture layer 24a is 1.46 g/cm³, the density of outer mixture layer 24b is about 1.17 g/cm³ to 1.38 g/cm³. By adjusting the difference in densities within this range so as to appropriately adjust the relative Li-ion receiving rates on the outer and inner circumference sides, it is possible to achieve both resistance and cycle characteristics at a high level.

The densities of outer mixture layer 24b and inner mixture layer 24a can be adjusted for example by means of suitable pressing treatment after the negative active material layer-forming pastes have been applied to negative electrode collector 22 and dried. The densities of outer mixture layer 24b and inner mixture layer 24a can be adjusted to the desired relative densities described here by varying the number of times pressing treatment is applied. For example, a first pressing can be performed after inner mixture layer 24a has been formed on one side of negative electrode collector 22, and a second pressing can then be performed after outer mixture layer 24b has been formed on the opposite side of negative electrode collector 22. In this case, because inner mixture layer 24a is pressed twice while outer mixture layer 24b is pressed once, a suitable difference in density can be provided between the outer mixture layer and the inner mixture layer.

Alternatively, the densities of outer mixture layer 24b and inner mixture layer 24a can be adjusted to the preferred relative densities described here by changing the tap density of the negative active material. Specifically, the tap density of the negative active material contained in outer mixture layer 24b can be made smaller than the tap density of the negative active material contained in inner mixture layer 24a. In general, the smaller the tap density of a negative active material, the more difficult it is to densely pack the negative active material during pressing, so the density of the negative active material layer tends to be smaller even with the same pressing pressure. Therefore, the densities of outer mixture layer 24b and inner mixture layer 24a can be adjusted to the desired relative densities disclosed here by making the tap density of the outer layer smaller than the tap density of the inner layer. This is desirable from the standpoint of productivity because the density difference can be achieved with only one pressing.

The various methods described above for adjusting the Li-ion receiving rate (for example, changing the percentage content of binder, changing the mix density and changing the specific surface area of the active material) can each be used independently, or a suitable combination thereof can be used.

The present invention is explained in detail below based on Examples 1 to 3.

Example 1

Preparation of Negative Electrode Sheet

In this example, negative electrode sheet 20 was prepared with different percentage contents of binder in outer mixture layer 24b and inner mixture layer 24a. Graphite powder was used as the negative active material. Two kinds of binder, styrene butadiene rubber (SBR) and carboxymethyl cellulose (CMC), were used together.

Outer mixture layer 24b was prepared by dispersing graphite powder, SBR and CMC in a water to a mass ratio of 98.6:0.7:0.7 of the three materials (binder content 1.4 mass %) to prepare an outer mixture layer paste, which was then applied to the surface of a long thin sheet of copper foil (negative electrode collector 22) and dried.

Inner mixture layer 24a was prepared by dispersing graphite powder, SBR and CMC in water to a mass ratio of 98:1:1 of the three materials (binder content 2 mass %) to prepare an inner mixture layer paste, which was then applied to the reverse surface of a long thin sheet of copper foil (negative electrode collector 22) and dried.

After drying, this was pressed so as to give outer mixture layer 24b and inner mixture layer 24a a density of about 1.4 g/cm³. Negative electrode sheet 20 having different percentage contents of binder in outer mixture layer 24b and inner mixture layer 24a was prepared in this way.

In Comparative Examples 1 and 2, negative electrode sheets were prepared having the same percentage content of binder in the outer and inner mixture layers. In Comparative Example 1, the inner mixture layer paste described above was applied (binder content 2 mass %) to both sides of a long thin sheet of copper foil (negative electrode collector 22) and dried to prepare a negative electrode sheet. In Comparative Example 2, the outer mixture layer paste described above (binder content 1.4 mass %) was applied to both sides of a long thin sheet of copper foil (negative electrode collector 22), and dried to prepare a negative electrode sheet.

Preparation of Lithium-Ion Batteries

Next, lithium-ion batteries for testing were prepared using the negative electrode sheets of Example 1 and Comparative Examples 1 and 2 thus prepared. The lithium-ion batteries for testing were prepared as follows.

Lithium nickel-cobalt-manganese oxide ($LiNi_{1/3}Co_{1/3}Mn_{1/3}O_2$) powder was used as the positive active material. First, the positive active material powder, acetylene black (AB) as a conductive material, and polyvinylidene fluoride (PVDF) as a binder were mixed in N-methylpyrrolidone (NMP) to a mass ratio of 85:10:5 of the three materials, to prepare a paste for the positive active material layer. The positive active material layer paste was applied in bands to both sides of a long thin sheet of aluminum foil (positive electrode collector 12), and dried to prepare positive electrode sheet 10 comprising positive active material layers 14 on both sides of positive electrode collector 12.

Negative electrode sheet 10 and positive electrode sheet 20 were wound together with two separator sheets (porous polypropylene) 40 therebetween to prepare wound electrode body 80. In wound electrode body 80, negative electrode sheet 20 was wound with outer mixture layer 24b facing the outer circumference (and inner mixture layer 24a facing the inner circumference). The resulting wound electrode body 80 was contained together with a non-aqueous liquid electrolyte in a type 18650 battery container 50. A non-aqueous liquid electrolyte comprising $LiPF_6$ as the supporting salt contained at a concentration of about 1 mol/liter in a mixed solvent comprising ethylene carbonate (EC), ethyl methyl carbonate (EMC) and dimethyl carbonate (DMC) at a volume ratio of 1:1:1 was used as the non-aqueous liquid electrolyte. Lithium-ion battery 100 was assembled in this way, and was then subjected to initial charge-discharge treatment (conditioning) by ordinary methods to obtain a lithium-ion battery for testing. The rating capacity of this lithium-ion battery was 300 mAh.

Measurement of Initial Capacity

The lithium-ion batteries for testing obtained as described above were charged in a constant-current constant-voltage system at current 1 C, voltage 4.1 V up to a charge time of 3 hours under temperature conditions of 25° C. After a 10 minute rest, the charged batteries were discharged at 25° C. at a constant current of ⅓ C to 3 V up to a charge time of 6 hours, and after a 10 minute rest, were discharged in a constant-current, constant-voltage system at current ⅓ C, voltage 3 V up to a discharge time of 4 hours. The discharge capacity at this time was measured as the initial capacity.

Low-Temperature Charge-Discharge Cycle Test

Each lithium-ion battery for testing was also subjected to cycle testing by repeated high-rate charge and discharge under low-temperature conditions. Specifically, CC charge was performed for 10 seconds at 15 C in a thermostatic tank at −30° C., followed by CC discharge at 2 C and a 10 minute rest, and this charge-discharge cycle was repeated 250 times continuously. The discharge capacity after the charge-discharge cycle test was measured under the same conditions as the initial capacity above. The capacity maintenance rate was calculated from the initial capacity and the capacity after charge-discharge cycle testing ((capacity after charge-discharge cycle testing/initial capacity)×100).

High-Temperature Storage Test

Each of these lithium-ion batteries for testing was also subjected to high-temperature storage testing by being stored for 30 days at 60° C. Specifically, each lithium-ion battery for testing was CC-CV charged under the same conditions as for initial capacity measurement, and stored for 30 days at 60° C. in this charged state. After storage, the battery was discharged under the same conditions as for initial capacity measurement, and the discharge capacity (capacity after high-temperature storage testing) was measured. The capacity maintenance rate was calculated from the initial capacity and the capacity after high-temperature storage testing ((capacity after high-temperature storage testing/initial capacity)×100). The results are shown in Table 1 and in graph form in FIG. 6.

TABLE 1

| | Inner binder content | Outer binder content | Capacity maintenance after low-temp charge-discharge cycle test | Capacity maintenance after high-temp storage test |
|---|---|---|---|---|
| Comparative Example 1 | 2 mass % | 2 mass % | 55% | 92% |
| Comparative Example 2 | 1.4 mass % | 1.4 mass % | 98% | 88% |
| Example 1 | 2 mass % | 1.4 mass % | 98% | 92% |

Figure 6:
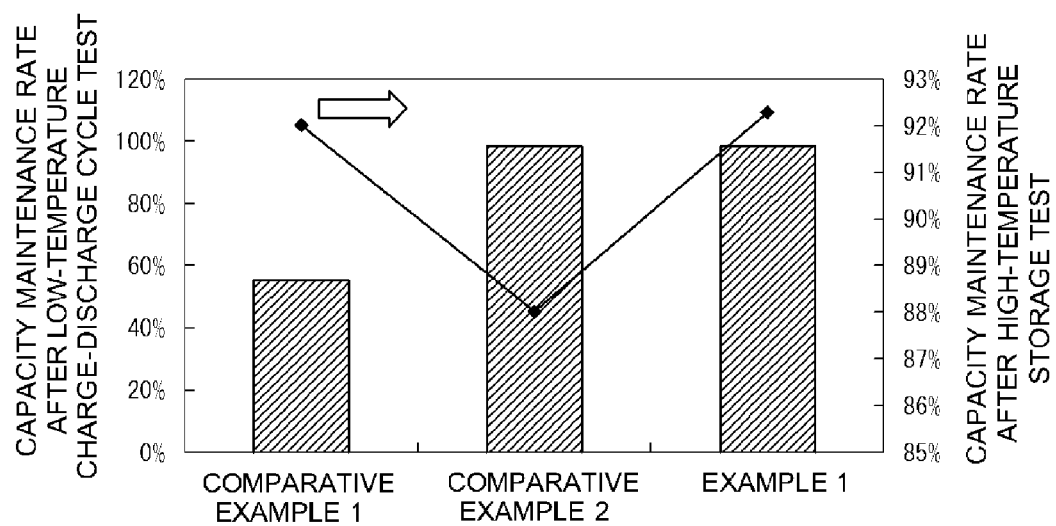
FIG. 6 shows the capacity maintenance rates after testing of the lithium secondary batteries of Example 1 and Comparative Examples 1 and 2.

As shown in Table 1 and FIG. 6, although the battery of Comparative Example 1 (outer: 2 mass %, inner: 2 mass %) had a high capacity maintenance rate after high-temperature storage testing, the capacity was much lower after charge-discharge cycle testing. The battery of Comparative Example 2 (outer: 1.4 mass %, inner: 1.4 mass %) had a high capacity maintenance rate after charge-discharge cycle testing, but a much lower capacity after high-temperature storage testing.

By contrast, the battery of Example 1 (outer: 1.4 mass %, inner: 2 mass %) had a capacity maintenance rate of over 90% after high-temperature storage testing, with almost no loss of capacity after charge-discharge cycle testing. These results show that high-temperature storage characteristics and cycle characteristics (particularly low-temperature characteristics) can be achieved at the same time by providing a difference in percentage content of binder between outer mixture layer 24*b* and inner mixture layer 24*a*, and suitable adjusting the relative Li ion receiving rates of the two.

The following test was also performed to confirm a difference in adhesiveness depending on whether heat is applied from the reverse side of the negative electrode collector or from both sides of the negative electrode collector when forming outer mixture layer 24*b*.

That is, in Test Example 1, the outer mixture layer paste described above (binder content 1.4 mass %) was applied to one side of a long thin sheet of copper foil (negative electrode collector 22), and hot air at about 90° was applied for 24 hours from the reverse side of the collector to dry the paste and prepare a negative electrode sheet. In Test Example 2, the procedure was the same as in Test Example 1 except that hot air at about 90° C. was applied for 24 hours from both sides of collector 22 to dry the paste and prepare a negative electrode sheet. The applied amount of the negative active material layer paste was adjusted to about 7.4 mg/cm$^2$ (as solids) in both cases.

The adhesiveness (peel strength between negative electrode collector 22 and outer mixture layer 24*b*) of the resulting negative electrode sheets of Test Example 1 and Test Example 2 was evaluated by a 90° peel test using a tensile tester. As a result, Test Example 1, which was heated only from the reverse side, had a peel strength of 4.3 N/cm$^2$, while Test Example 2, which was heated from both sides, had a peel strength of 1.5 N/cm$^2$. These results confirm that adhesiveness is improved by drying with heat applied from the reverse side of the collector.

Example 2

In this example, a negative electrode sheet 20 was prepared having different specific surface areas of the active material in outer mixture layer 24*b* and inner mixture layer 24*a*.

Outer mixture layer 24*b* was formed using graphite powder (average particle size 11.2 μm) with a specific surface area of 4.9 m$^2$/g as the negative active material. Specifically, this graphite powder, SBR and CMC were dispersed in water to a mass ratio of 98:1:1 of the three materials to prepare an outer mixture layer paste which was applied to the surface of a long thin sheet of copper foil (negative electrode collector 22) and dried.

Inner mixture layer 24*a* was formed using graphite powder (average particle size 12.1 μm) with a specific surface area of 4.4 m$^2$/g as the negative active material. Specifically, this graphite powder, SBR and CMC were dispersed in water to a mass ratio of 98:1:1 of the three materials to prepare an inner mixture layer paste which was applied to the reverse surface of a long thin sheet of copper foil (negative electrode collector 22) and dried.

After drying, this was pressed to give both outer mixture layer 24*b* and inner mixture layer 24*a* a density of about 1.4 g/cm$^3$. A negative electrode sheet 20 having different specific surface areas of the active material in outer mixture layer 24*b* and inner mixture layer 24*a* was prepared in this way.

In Comparative Examples 3 and 4, negative electrode sheets were prepared having the same specific surface area of the active material in the outer mixture layer and inner mixture layer. In Comparative Example 3, the inner mixture layer paste described above (specific surface area of graphite powder=4.4 m$^2$/g) was applied to both sides of a long thin sheet of copper foil (negative electrode collector 22) and dried to prepare a negative electrode sheet. In Comparative Example 4, the outer mixture layer paste described above (specific surface area of graphite powder=4.9 m$^2$/g) was applied to both sides of a long thin sheet of copper foil (negative electrode collector 22) and dried to prepare a negative electrode sheet.

Next, the negative electrode sheets of Example 2 and Comparative Examples 3 and 4 thus prepared were used to prepare lithium-ion batteries for testing. The lithium-ion batteries for testing were prepared as in Example 1 above.

The initial capacity of the lithium-ion batteries for testing obtained as described above was measured. Each lithium-ion battery for testing was also subjected to a cycle test by repeated charge and discharge at a low temperature (0° C.), and the capacity maintenance rate after cycle testing was calculated. Each lithium-ion battery for testing was also subjected to high-temperature storage testing, and the capacity maintenance rate after high-temperature storage testing was calculated. The conditions for each test were the same as in Example 1. The results are shown in Table 2 and in graph form in FIG. 7.

TABLE 2

|  | Inner specific surface area | Outer specific surface area | Capacity maintenance after low-temp charge-discharge cycle test | Capacity maintenance after high-temp storage test |
| --- | --- | --- | --- | --- |
| Comparative Example 3 | 4.4 m$^2$/g | 4.4 m$^2$/g | 55% | 92% |
| Comparative Example 4 | 4.9 m$^2$/g | 4.9 m$^2$/g | 97% | 86% |
| Example 2 | 4.4 m$^2$/g | 4.9 m$^2$/g | 97% | 91% |

Figure 7:
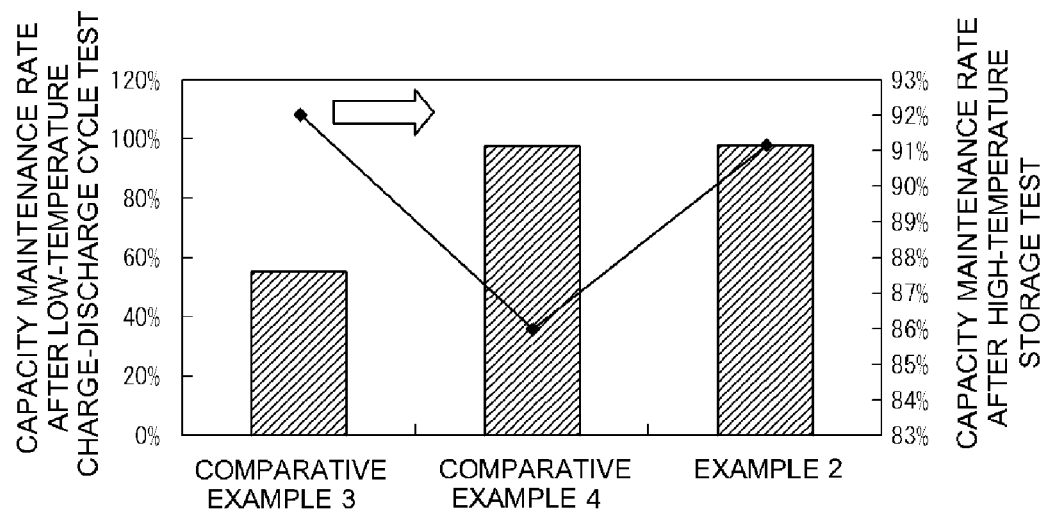
FIG. 7 shows the characteristics of the lithium secondary batteries of Example 2 and Comparative Examples 3 and 4.

As shown in Table 2 and FIG. 7, the battery of Comparative Example 3 (outer: 4.4 m$^2$/g, inner: 4.4 m$^2$/g) had a high capacity maintenance rate after high-temperature storage testing, but a much lower capacity after charge-discharge cycle testing. On the other hand, the battery of Comparative Example 4 (outer: 4.9 m$^2$/g, inner: 4.9 m$^2$/g) had a high capacity maintenance rate after charge-discharge cycle testing, but a much lower capacity after high-temperature storage testing.

By contrast, the battery of Example 2 (outer: 4.4 m$^2$/g, inner: 4.9 m$^2$/g) had a capacity maintenance rate of over 90% after high-temperature storage testing, with little loss in capacity after charge-discharge cycle testing. These results confirm that high-temperature storage characteristics and cycle characteristics (particularly low-temperature characteristics) can be achieved at the same time by providing a difference in specific surface area between outer mixture layer 24b and inner mixture layer 24a, and suitable adjusting the relative Li ion receiving rates of the two.

Example 3

In this example, a negative electrode sheet 20 was prepared in which the densities of outer mixture layer 24b and inner mixture layer 24a were different.

Inner mixture layer 24a was formed using graphite powder with a tap density of 1.03 g/cm$^3$ as the negative active material. Specifically, this graphite powder, SBR and CMC were dispersed in water to a mass ratio of 98:1:1 of the three materials to prepare an inner mixture layer paste which was applied to the surface of a long thin sheet of copper foil (negative electrode collector 22) and dried. After drying, this was pressed until the density of inner mixture layer 24a was about 1.5 g/cm$^3$.

Outer mixture layer 24b was formed using graphite powder with a tap density of 0.81 g/cm$^3$ as the negative active material. Specifically this graphite powder, SBR and CMC were dispersed in water to a mass ratio of 98:1:1 of the three materials to prepare a inner mixture layer paste which was applied to the reverse surface of a long thin sheet of copper foil (negative electrode collector 22) and dried. After drying, this was pressed until the density of inner mixture layer 24b was about 1.3 g/cm$^3$.

A negative sheet 20 in which the densities of outer mixture layer 24b and inner mixture layer 24a were different was prepared in this way.

In Comparative Examples 5 and 6, negative electrode sheets were prepared in which the densities of the outer mixture layer and inner mixture layer were the same. In Comparative Example 5, the inner mixture layer paste described above (graphite powder tap density=1.03 g/cm$^3$) was applied to both sides of a long thin sheet of copper foil (negative electrode collector 22), and dried to prepare a negative electrode sheet. After drying, this was pressed until the densities of outer mixture layer 24b and inner mixture layer 24a were both about 1.5 g/cm$^3$. In Comparative Example 6, the outer mixture layer paste described above (graphite powder tap density=0.81 g/cm$^3$) was applied to both sides of a long thin sheet of copper foil (negative electrode collector 22), and dried to prepare a negative electrode sheet. After drying, this was pressed until the densities of outer mixture layer 24b and inner mixture layer 24a were both about 1.3 g/cm$^3$.

Next, the negative electrode sheets of Example 3 and Comparative Examples 5 and 6 thus prepared were used to prepare lithium-ion batteries for testing. The lithium-ion batteries for testing were prepared as in Examples 1 and 2 above.

Figure 8:
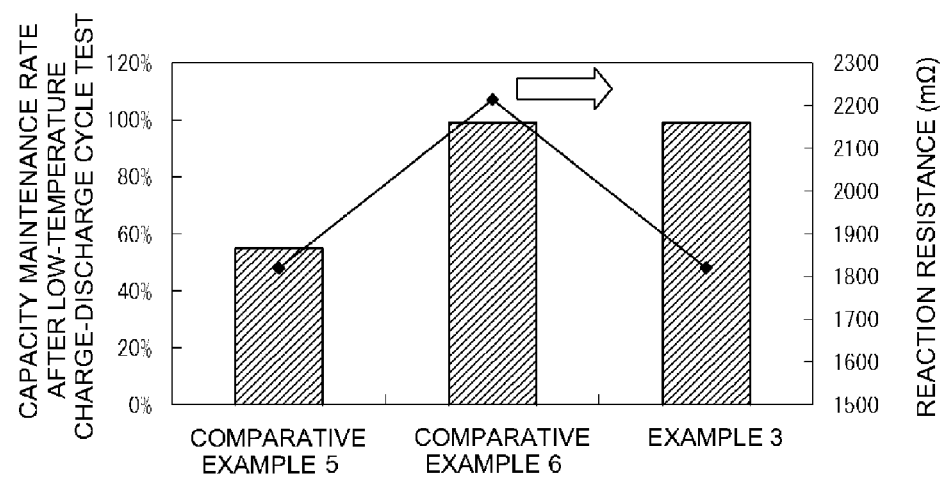
FIG. 8 shows the characteristics of the lithium secondary batteries of Example 3 and Comparative Examples 5 and 6.

The initial capacity of the lithium-ion batteries for testing obtained as described above was measured. Each lithium-ion battery for testing was also subjected to a cycle test by repeated charge and discharge at a low temperature (0° C.), and the capacity maintenance rate after cycle testing was calculated. The conditions for each test were the same as in Examples 1 and 2. The AC impedance of each lithium-ion battery for testing was also measured at −30° C., and reaction resistance (mΩ) was determined by equivalent circuit fitting of the resulting Cole-Cole plot. The results are shown in Table 3 and in graph form in FIG. 8.

TABLE 3

|  | Inner density | Outer density | Capacity maintenance rate after low-temperature charge-discharge cycle test | Reaction resistance (mΩ) |
| --- | --- | --- | --- | --- |
| Comparative Example 5 | 1.5 g/cm$^3$ | 1.5 g/cm$^3$ | 55% | 1828 |
| Comparative Example 6 | 1.3 g/cm$^3$ | 1.3 g/cm$^3$ | 98% | 2216 |
| Example 3 | 1.5 g/cm$^3$ | 1.3 g/cm$^3$ | 98% | 1834 |

As shown in Table 2 and FIG. 7, the battery of Comparative Example 5 (outer: 1.5 g/cm$^3$, inner: 1.5 g/cm$^3$) had improved charge-discharge characteristics with less reaction resistance, but the capacity was much lower after cycle testing. On the other hand, the battery of Comparative Example 6 (outer: 1.3 g/cm$^3$, inner: 1.3 g/cm$^3$) had a high capacity maintenance rate after cycle testing, but poor charge-discharge characteristics with an increase in reaction resistance.

By contrast, the battery of Example 3 (outer: 1.5 g/cm$^3$, inner: 1.3 g/cm$^3$) had relatively low reaction resistance, and almost no loss in capacity after charge-discharge cycle testing. These results confirm that improved cycle characteristics (especially low-temperature characteristics) can be obtained while controlling an increase in resistance by providing a density difference between outer mixture layer 24b and inner mixture layer 24a to suitably adjust the relative Li-ion receiving rates of the two.

The present invention was explained above using preferred embodiments, but these descriptions are not limiting, and various modifications are of course possible.

Figure 9:
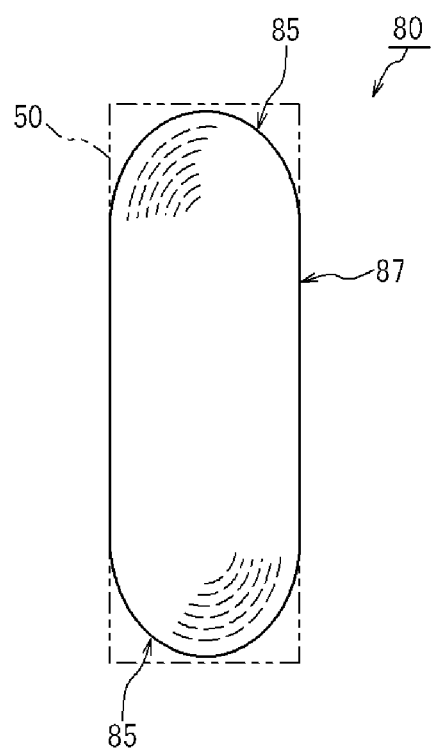
FIG. 9 illustrates a (flat) wound electrode body of a lithium secondary battery of one embodiment of the present invention.

For example, as shown in FIG. 9, the present invention is not limited to a cylindrically wound electrode body, and can also be applied to a flat wound electrode body 80. In this case, battery case 50 typically has a box shape. Flat wound electrode body 80 is formed of two bent sections (curved R sections) 85 which are bent toward the inside of electrode body 80, and flat section 87 extending in a straight line. In this case, only the two bent section (curved R sections) 85 that are bent toward the inside preferably fulfill requirement (1) and/or (2) above, but from the standpoint of ease of manufacture, bent sections 85 and flat section 87 may all fulfill requirements (1) and/or (2) above.

Figure 10:
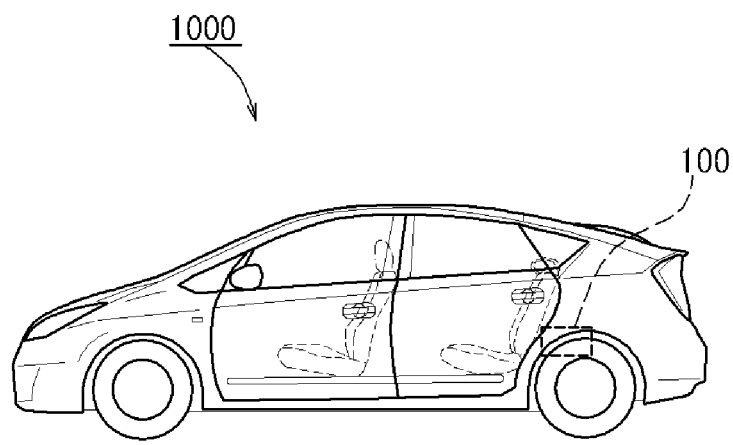
FIG. 10 is a side view illustrating a vehicle equipped with a lithium secondary battery of one embodiment of the present invention.
Figure 11:
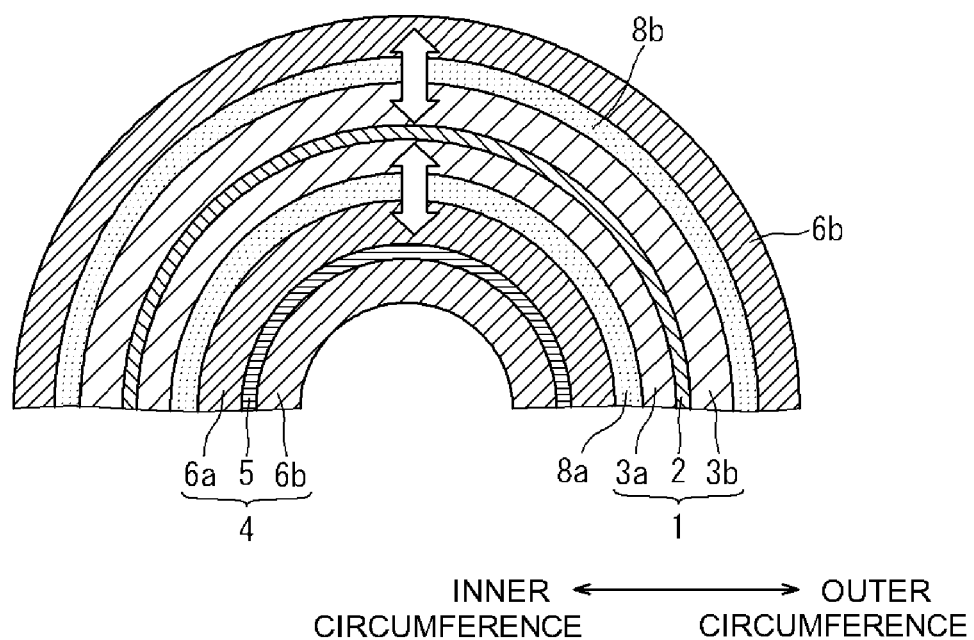
FIG. 11 is an enlarged cross-section showing the essential parts of a wound electrode body of a conventional lithium secondary battery.

Any of the lithium secondary batteries 100 disclosed here may have performance suited to a battery for mounting in a vehicle, and may have excellent durability (especially low-temperature characteristics) with respect to charge-discharge cycles in particular. Thus, the present invention provides vehicle 1000 equipped with any of the lithium secondary batteries 100 disclosed here as shown in FIG. 10. In particular, it provides vehicle 1000 (such as an automobile) equipped with this lithium secondary battery 100 as a power source (typically, the power source of a hybrid vehicle or electric vehicle).

INDUSTRIAL APPLICABILITY

With the configuration of the present invention, it is possible to provide a lithium secondary battery having enhanced durability with respect to charge-discharge cycles (especially charge-discharge cycles at low temperatures).

The invention claimed is:

1. A lithium secondary battery comprising a wound electrode body having a positive electrode sheet and a negative electrode sheet wound together with a separator therebetween,
wherein the negative electrode sheet includes:
a sheet-shaped negative electrode collector,
an inner negative active material layer formed on a surface of the negative electrode collector facing an inner circumference of the wound electrode body, and
an outer negative active material layer formed on a surface of the negative electrode collector facing an outer circumference of the wound electrode body, and wherein
a theoretical capacity of a negative active material per unit area in the outer negative active material layer on the outer circumference side surface of said negative electrode collector is substantially the same as a theoretical capacity of a negative active material per unit area in the inner negative active material layer on the inner circumference side surface of said negative electrode collector, and at least one of the following conditions is met with respect to at least part of a bent section that is bent toward the inside of the wound electrode body:
(1) a percentage content of binder of the outer negative active material layer is smaller than a percentage content of binder of the inner negative active material layer; and
(2) a density of the outer negative active material layer is smaller than a density of the inner negative active material layer, and a tap density of the negative active material contained in the outer negative active material layer is smaller than a tap density of the negative active material contained in the inner negative active material layer.

2. The lithium secondary battery according to claim 1, wherein the percentage content of binder of the outer negative active material layer is 50% to 90% of the percentage content of binder of the inner negative active material layer.

3. The lithium secondary battery according to claim 1, wherein the outer negative active material layer and the inner negative active material layer are made of the same negative active material.

4. The lithium secondary battery according to claim 1, wherein a specific surface area of the negative active material contained in the outer negative active material layer is greater than a specific surface area of the negative active material contained in the inner negative active material layer.

5. The lithium secondary battery according to claim 1, wherein the electrode body is wound in a cylindrical shape.

6. A vehicle, comprising a lithium secondary battery comprising a wound electrode body having a positive electrode sheet and a negative electrode sheet wound together with a separator therebetween,
wherein the negative electrode sheet includes:
a sheet-shaped negative electrode collector,
an inner negative active material layer formed on a surface of the negative electrode collector facing an inner circumference of the wound electrode body, and
an outer negative active material layer formed on a surface of the negative electrode collector facing an outer circumference of the wound electrode body, and wherein
a theoretical capacity of a negative active material per unit area in the outer negative active material layer on the outer circumference side surface of said negative electrode collector is substantially the same as a theoretical capacity of a negative active material per unit area in the inner negative active material layer on the inner circumference side surface of said negative electrode collector, and at least one of the following conditions is met with respect to at least part of a bent section that is bent toward the inside of the wound electrode body:
(1) a percentage content of binder of the outer negative active material layer is smaller than a percentage content of binder of the inner negative active material layer; and
(2) a density of the outer negative active material layer is smaller than a density of the inner negative active material layer, and a tap density of the negative active material contained in the outer negative active material layer is smaller than a tap density of the negative active material contained in the inner negative active material layer.

7. The lithium secondary battery according to claim 1, wherein the percentage content of binder of the outer negative active material layer is 0.6 mass % to 2.8 mass % of the total mass of the outer negative active material layer and the percentage content of binder of the inner negative active material layer is 1.2 mass % to 3 mass % of the total mass of the inner negative active material layer.

8. The lithium secondary battery according to claim 1, wherein the ratio of the density of the outer negative active material layer to the density of the inner negative active material layer is 80% to 95%.

9. The lithium secondary battery according to claim 1, wherein the density of the outer negative active material layer is 1 g/cm$^3$ to 1.6 g/cm$^3$ and the density of the inner negative active material layer is 1.2 g/cm$^3$ to 1.7 g/cm$^3$.

* * * * *